(12) United States Patent
Moulton

(10) Patent No.: US 7,377,704 B2
(45) Date of Patent: May 27, 2008

(54) UNIVERSAL THROUGH SIGHT CAMERA SYSTEM FOR ARMY TACTICAL VEHICLES

(76) Inventor: John P Moulton, 44 Village Grove Rd., Fredericksburg, VA (US) 22406

( * ) Notice: Subject to any disclaimer, the term of this patent is extended or adjusted under 35 U.S.C. 154(b) by 360 days.

(21) Appl. No.: 11/054,306

(22) Filed: Feb. 10, 2005

(65) Prior Publication Data

US 2006/0177218 A1    Aug. 10, 2006

(51) Int. Cl.
*G03B 17/00* (2006.01)
*G02B 23/00* (2006.01)

(52) U.S. Cl. .................. 396/419; 396/432; 348/373

(58) Field of Classification Search ............... 396/419, 396/428, 429, 432, 544; 348/373, 376, 211.14, 348/61, 335; 359/363
See application file for complete search history.

(56) References Cited

U.S. PATENT DOCUMENTS

| | | | | |
|---|---|---|---|---|
| 5,053,794 A | * | 10/1991 | Benz | 396/432 |
| 6,123,006 A | * | 9/2000 | Bedford et al. | 89/41.06 |
| 6,539,661 B2 | * | 4/2003 | Hope | 42/119 |

* cited by examiner

*Primary Examiner*—W. B. Perkey
*Assistant Examiner*—Rishi Suthar
(74) *Attorney, Agent, or Firm*—Richard C. Litman

(57) ABSTRACT

A universal through sight camera system for army tactical vehicles is provided, which includes a universal through sight camera housing that mounts to the Army's M1 ABRAMS tank GUNNER's primary sight extension (GPS-e) by way of clamping onto the outer black anodized eyepiece ring of the GPS-e; a remote head CCD camera easily removable from the camera housing; and three optics adapter rings for adapting the universal through sight camera and housing to other gun's sights. These adapter rings include the M1 GUNNER's auxiliary sight adapter ring; the M2 COMMANDER's extension adapter ring and the M2 auxiliary sight adapter ring.

11 Claims, 6 Drawing Sheets

UNIVERSAL THROUGH SIGHT CAMERA SYSTEM FOR ARMY TACTICAL VEHICLES

FIELD OF THE INVENTION

The present invention relates to gun sigh camera systems and, more specifically, to a universal through sight camera system that enables video to be captured from the optical gun sighting systems of the US Army's M1 ABRAMS and M2 BRADLEY fighting vehicles, all through the use of a single universal through sight camera and associated adapter rings that allow a single through sight camera to be mounted to the various optical sights on all ABRAMS and BRADLEY vehicle variants.

DESCRIPTION OF RELATED ART

Conventional gun sight camera systems for obtaining video imagery through tactical gun sights on military vehicles are quite bulky and are designed for a single gun sight, requiring additional unique designs for different gun sights, thereby adding significant additional cost to the end user desiring video imagery from other gun sights. The present invention provides a single universal through sight camera with corresponding adapters to allow universal mounting of a single through sight camera to a host of gun sight optics for the Army's M1 ABRAMS main battle tanks and the M2 BRADLEY fighting vehicles.

The relevant art is fairly represented by the following discussion and teaching of the enumerated patents.

What is generally know is gun sight video cameras typically require a video camera be mounted off to the side of the gun sight optics with the camera aperture looking in the gun sight through the use of a glass beam splitter cube which possesses both light reflecting and light transmitting properties. This allows the gun sight observer to look through the glass cube as normal, while the camera sees the gun sight image via the right angle reflection of the beam splitter's prism interface.

U.S. Pat. No. 4,863,269 issued Sep. 5, 1989, to Stafford M. Ellis teaches a weapon sight night vision gun sight that provides an intensified image of an external scene and an image of an illuminated reticle superimposed on the users direct view of the external scene through the sight.

U.S. Pat. No. 4,732,438 issued Mar. 22, 1988, to Zvi Orbach, et. al. teaches an optical viewing instrument including an eyepiece for viewing a field, a beam splitter with a housing and splitting the field viewed via the eyepiece into a first image for direct viewing by a first observer and a second image for viewing by a second observer.

None of the above inventions and patents, taken either singly or in combination, is seen to describe the instant invention as claim.

SUMMARY OF THE INVENTION

The invention is a universal through sight camera system that enables video to be captured from the optical gun sighting systems of the US Army's M1 ABRAMS and M2 BRADLEY fighting vehicles, all through the use of a single universal through sight camera and associated adapter rings that allow a single through sight camera to be mounted to the various optical sights on all ABRAMS and BRADLEY vehicle variants.

Accordingly, it is the principle object of the invention to provide a means of mounting a single through sight camera to multiple gun sight optics inside the Army's M1 ABRAMS main battle tank and the M2 BRADLEY fighting vehicle without the need for additional custom designed camera systems. A single electronic camera apparatus can be used on multiple gun sights through the use of a universal camera apparatus and simple and inexpensive adapter rings made specifically for each gun sight. It is another object of the invention to provide that the through sight camera CCD device be remotely separated from the camera electronics as well as separately sealed and removable from the universal through sight housing to facilitate rapid repair/replacement of the camera electronics without the need to repair/replace the universal through sight camera housing.

DETAILED DESCRIPTION OF THE PREFERRED EMBODIMENTS

Figure 1:
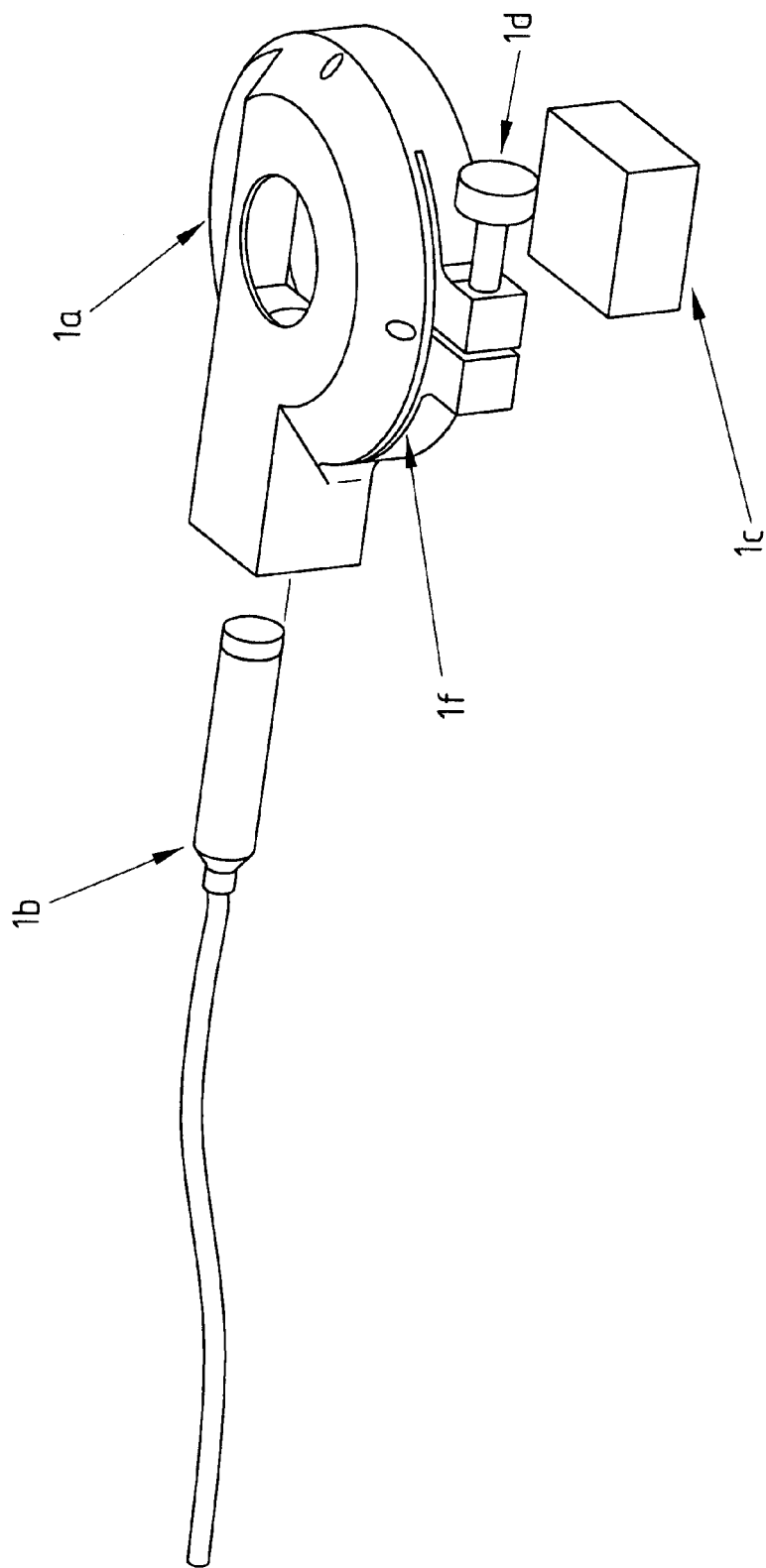
FIG. 1 is a perspective view of the universal through sight camera, showing the remote head CCD and the universal through sight mount.

The universal through sight camera (FIG. 1), consists of a camera housing (1*a*), a remote head camera (~8.5 mm in diameter) with mirror image video output (1*b*) that fits into a side hole in the camera housing, a 25 mm beam splitter optical cube, cut and repolished to a dimension of (approx) 25 mm×25 mm×9 mm thick (1*c*) and a thumb screw tightening mechanism (1*e*). The camera housing has a slotted groove (1*f*) cut into the housing and the ring is split to allow the radius of the housing to flex and become smaller when the thumb screw is tightened.

Figure 2:
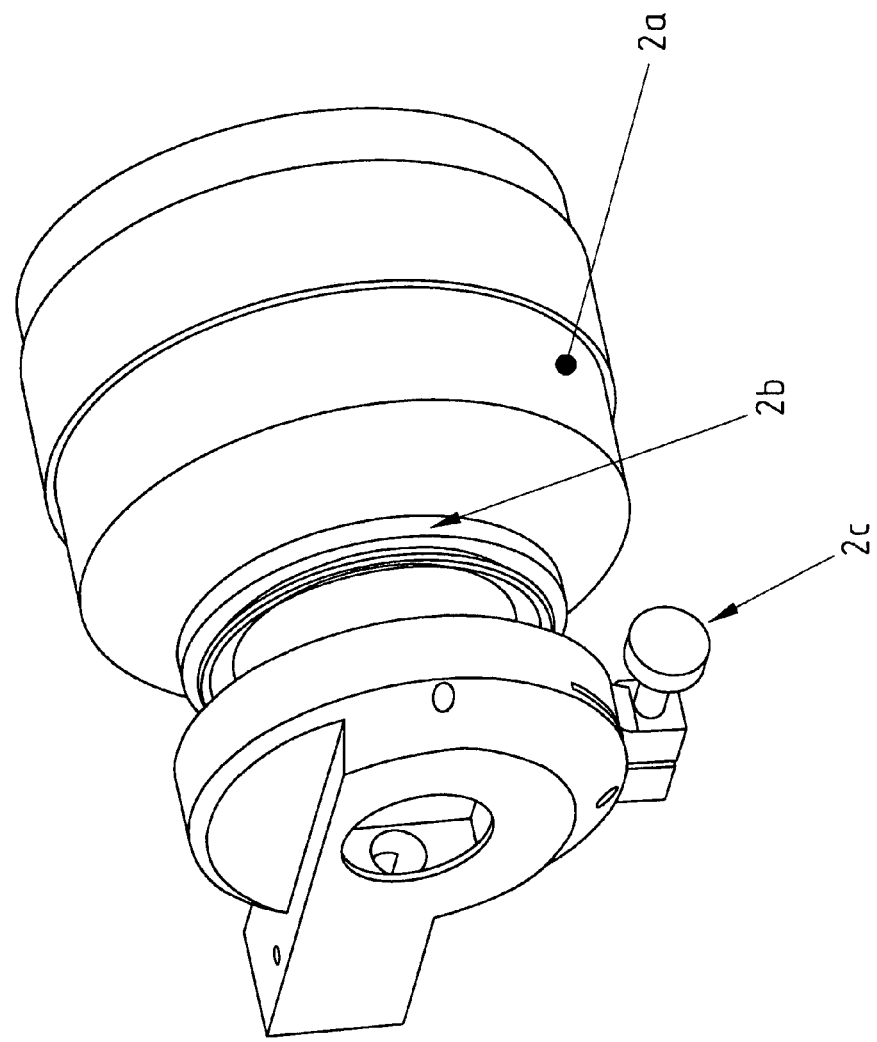
FIG. 2 is a perspective view of the universal through sight mount fitup to the M1 ABRAMS' GPS-e optics.
Figure 3A:
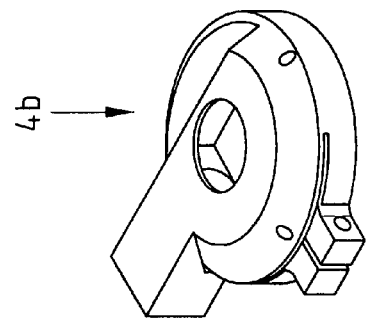
FIG. 3A is a perspective view of the universal sight camera housing.
Figure 3B:
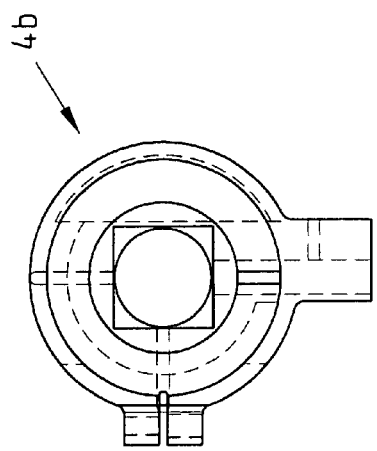
FIG. 3B is a bottom, cross-sectional view of the universal sight camera housing.
Figure 3D:
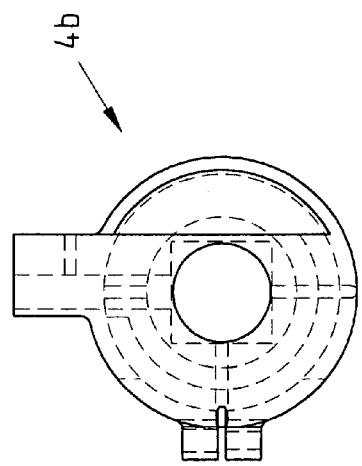
FIG. 3D is a top. cross-sectional view of the universal sight camera housing.
Figure 3C:
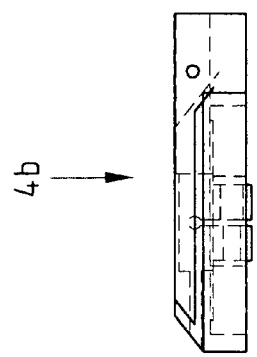
FIG. 3C is a side, cross-sectional view of the universal sight camera housing.

The universal through sight camera is designed to mount as is (i.e. without any adapter rings) to the M1 ABRAMS GUNNER's primary sight (GPS) or GPS extension (GPS-e). The fitup of the camera to the GPS-e is shown in FIG. 2. The camera mounts to the GPS or GPS-e (2*a*) by compression fit over the black aluminum lop immediately under the GPS (GPS-e) rubber eye cup (2b). The camera is secured via the thumb screw on the camera housing (2c).

The universal through sight camera housing is made of a light weight and durable material (plastic, aluminum or composite). The camera housing is best shown in FIGS. 3A-3D. In the preferred embodiment, the camera housing has the following approximate dimensions: the inside radius is approximately 30.15 mm and the overall outside radius is approximately 34.5 mm. The overall thickness is approximately 19 mm. The camera protrusion that houses the remote head camera is approximately 24 mm long. The inside square cut out that holds the beam splitter glass is approximately 25 mm×25 mm. When the camera is installed into the optics sight, the eye relief (i.e. the distance the eye stands away from the rubber eyepiece of the sight) is approximately 10 mm (+/−1 mm).

Figure 4C:
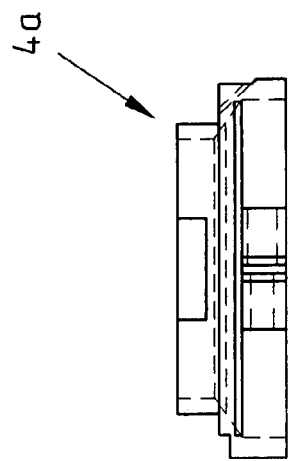
FIG. 4A is a perspective attachment view of the adapter ring for adapting the universal through sight camera to the M2 COMMANDER's extension optics.
FIG. 4B is a lower, perspective view of the adapter ring of FIG. 4A.
Figure 4B:
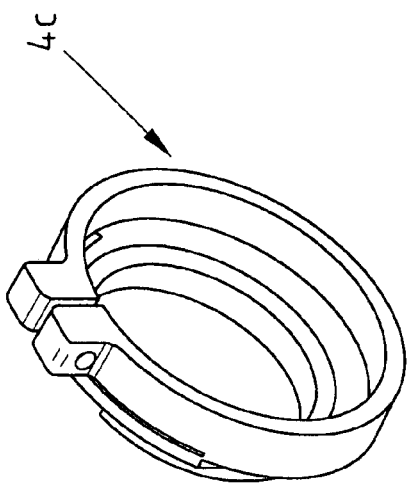
Figure 4A:
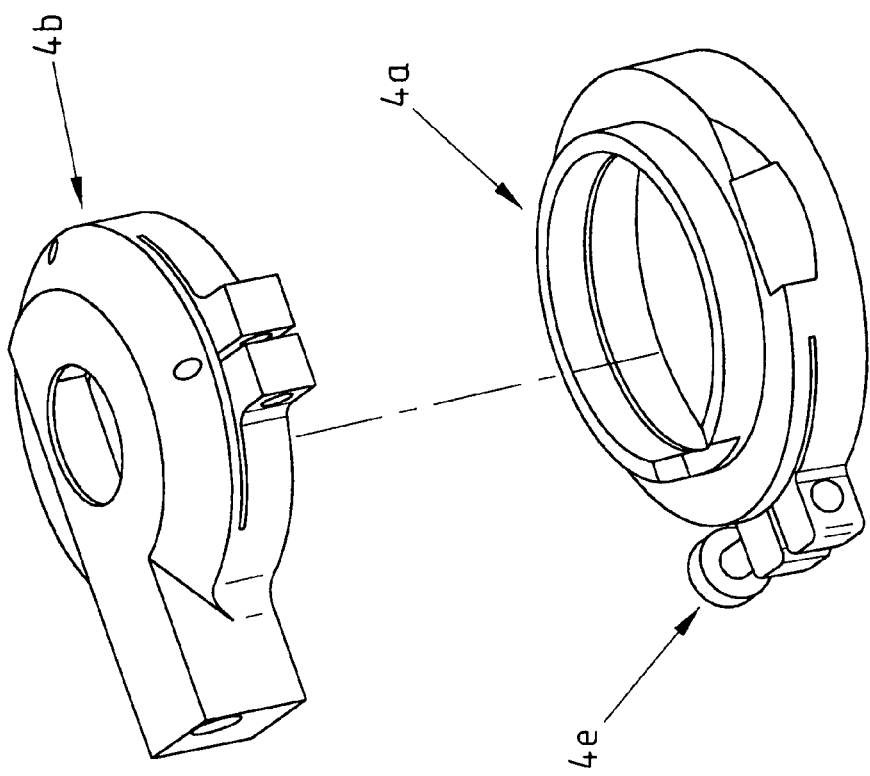
Figure 5C:
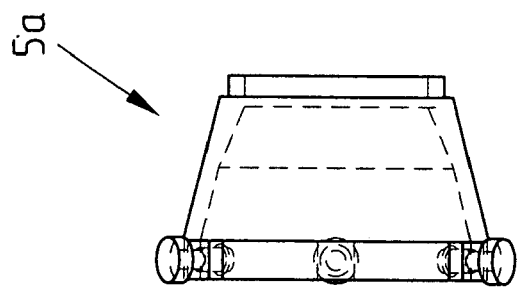
FIG. 5C is a side, partial cross-sectional view of the adapter ring of FIG. 5A.
Figure 5B:
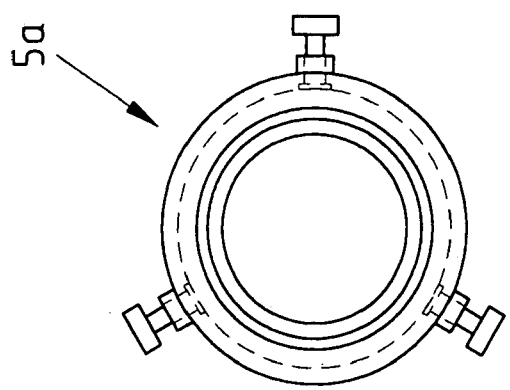
FIG. 5B is a top, partial cross-sectional view of the adapter ring of FIG. 5A.
Figure 5A:
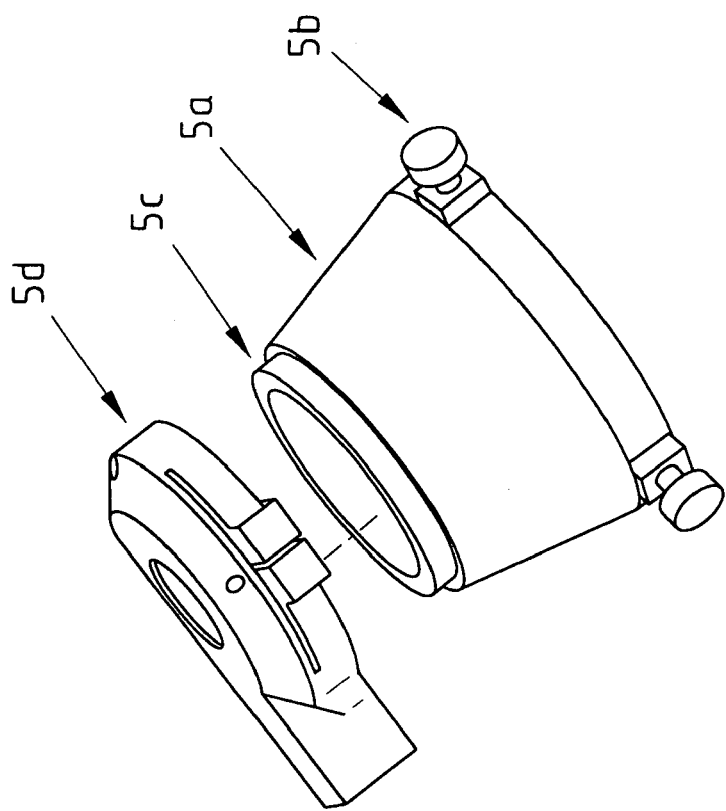
FIG. 5A is a perspective attachment view of the adapter ring for adapting the universal through sight camera to the M1 GUNNER's auxiliary sight.
Figure 6C:
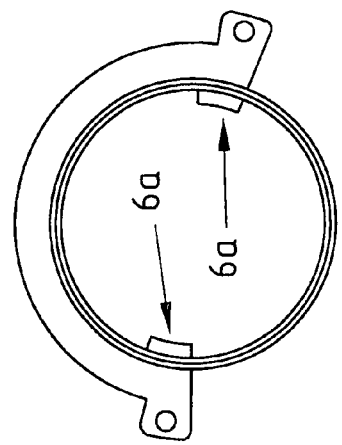
FIG. 6C is a top view of the adapter ring of FIG. 6A.
Figure 6B:
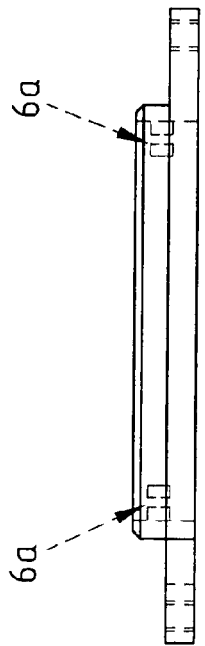
FIG. 6B is a side, partial cross-sectional view of the adapter ring of FIG. 6A.
Figure 6A:
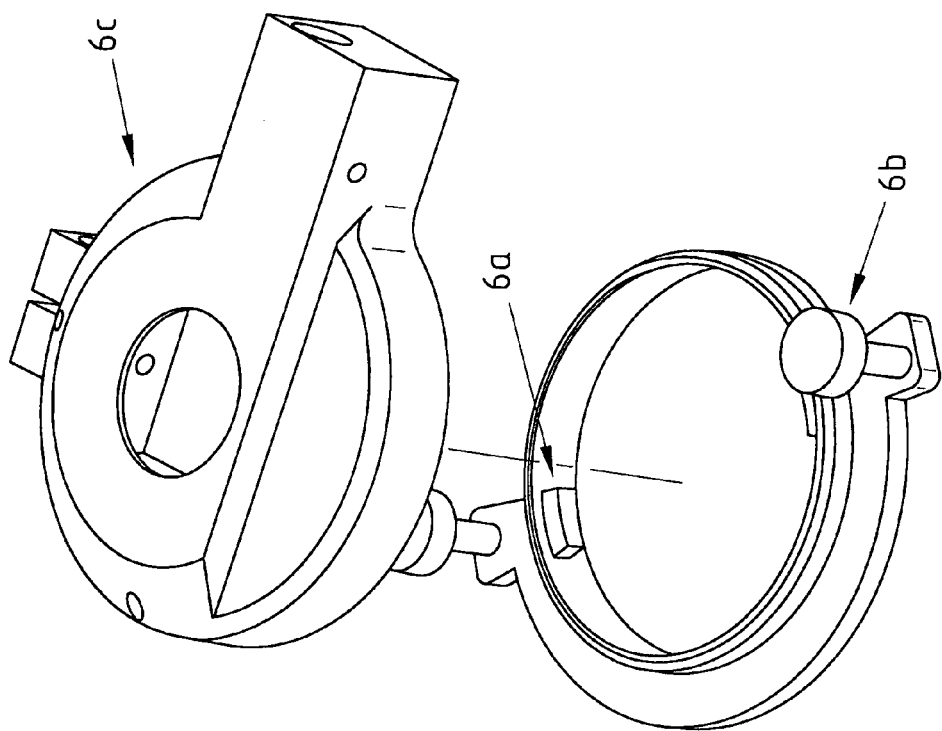
FIG. 6A is a perspective attachment view of the adapter ring for adapting the universal through sight camera to the M2 auxiliary sight.

The through sight camera adapter rings are designed to provide a mating interface between the additional optical sighting systems on the ABRAMS and BRADLEY vehicles and the universal through sight camera. These adapter rings include the M2 COMMANDER's extension optics adapter ring (best shown in FIGS. 4A-4C). the M1 GUNNER's auxiliary sight (GAS) adapter ring (best shown in FIGS. 5A-5C) and the M2 auxiliary sight adapter ring (best shown in FIGS. 6A-6C).

The M2 COMMANDER's extension adapter ring (shown in FIGS. 4A-4C) is a circular adapter ring made of plastic or similar light weight and durable material. This adapter ring has an upper mating ring (4a) of an outside diameter of approximately 60 mm that allows the universal camera (4b) to mate to it, and a bottom mating ring (4c) with an inside diameter of approximately 69 mm to allow this side to mate to the M2 COMMANDER's sighting tube. The adapter ring has a thumb screw tightening mechanism (4d) that allows the adapter ring to be securely tightened around the COMMANDER's extension optics tube. This adapter ring has a total thickness of approximately 22 mm and an overall outside diameter of approximately 79 mm.

The M1 GUNNER's auxiliary sight (GAS) adapter ring (shown in FIGS. 5A-5C) is a conical shaped adapter made of plastic or other suitable material and is designed to fit on the GUNNER's auxiliary sight optics tube in the M1 ABRAMS tank variants. The adapter ring (5a) has 3 thumb screws located at 120 degree spacing around the base of the adapter ring (5b) that tighten the ring to the sighting tube. The top of the adapter ring has a mating lip (5c) of approximately 60 mm outside diameter to receive the previously described universal through sight camera (5d). The adapter ring has an overall height of 56 mm and an overall diameter of 76.5 mm.

The M2 auxiliary sight adapter ring (shown in FIGS. 6A-6C) is made of aluminum or similar durable and light weight material. The ring consists of an inner mating ring (approximately 60 mm outside diameter and 55 mm inside diameter and 8.6 mm thick), an outer face plate ring; two backing plate tabs; backing plate thumb screws (6b); and inner locking ring tabs (6a).

The M2 auxiliary sight adapter ring (shown in FIGS. 6A-6C) takes the place of the rubber eye cup of the auxiliary sight optics on the M2 vehicle and is secured by screwing the inner locking ring tabs (6a) onto the auxiliary sight optics extension (where the rubber eye cup was). The adapter ring is secured against the optics tube via the backing plate thumb screws (6b). The universal through sight camera (6c) then fits on the inner mating ring (6d) and is secured via the universal through sight camera thumb screw tightening mechanism. The M2 auxiliary sight adapter ring has an overall diameter of 88.9 mm, an inner mating ring diameter of approximately 60.2 mm and an overall thickness of 8.7 mm.

I claim:

1. A universal through sight camera system, comprising: a universal camera housing including a housing ring and a mating ring; a charge-coupled device camera slidably and removably received within an opening formed through the universal camera housing; and, means for selectively reducing the outer radius of said housing ring, whereby an inner radius of said mating ring is adapted for mounting on an outer lip of an eyepiece ring of a GPS-extension optical system.

2. The universal through sight camera system as recited in claim 1, wherein the charge-coupled device camera has a diameter of approximately 8 mm.

3. The universal through sight camera system as recited in claim 1, wherein the opening has a substantially circular contour.

4. The universal through sight camera system as recited in claim 1, wherein said means for selectively reducing the outer radius of said housing ring comprises a thumb screw threadedly and adjustably joined to said housing ring, said housing ring having a slotted groove formed therein.

5. The universal through sight camera system as recited in claim 1, further comprising an extension adapter ring adapted for releasably mounting the universal camera housing to an extension optics.

6. The universal through sight camera system as recited in claim 5, wherein the extension adapter ring comprises an upper mating ring for releasably mating with the universal camera housing, and a lower mating ring for releasably mating with the extension optics.

7. The universal through sight camera system as recited in claim 1, further comprising an auxiliary sight adapter ring adapted for releasably mounting the universal camera housing to an auxiliary sight.

8. The universal through sight camera system as recited in claim 7, wherein said auxiliary sight adapter ring comprises: a substantially conically-shaped central member; a top mating ring adapted for releasable mating with the universal camera housing; and, a bottom mating ring adapted for releasable mating with the auxiliary sight.

9. The universal through sight camera system as recited in claim 8, further comprising means for releasably and adjustably securing the bottom mating ring to the auxiliary sight.

10. The universal through sight camera system as recited in claim 9, wherein the means for releasably and adjustably securing the bottom mating ring to the auxiliary sight comprises at least one thumb screw.

11. A universal through sight camera system, comprising: a universal camera housing including a housing ring and a mating ring; a charge-coupled device camera slidably and removably received within an opening formed through the universal camera housing; and, means for selectively reducing the outer radius of said housing ring, whereby an inner radius of said mating ring is adapted for mounting on an outer lip of an eyepiece ring of a GPS-extension optical system, wherein said universal camera housing includes first and second portions, said first portion having a substantially circular contour, said second portion projecting outwardly and extending from said first portion in a substantially radial direction, the opening being formed through said second portion.

* * * * *